United States Patent
Pautrat et al.

[11] 3,855,348
[45] Dec. 17, 1974

[54] METHOD FOR THE CHEMICAL MODIFICATION OF ETHYLENICALLY UNSATURATED POLYMERS AND PRODUCTS OBTAINED THEREBY

[75] Inventors: Rene Pautrat; Jacques Marteau, both of Courbevoie, France

[73] Assignee: ANVAR Agence Nationale de Valorisation de la Recherche, Tour Aurore, Courbevoie, France

[22] Filed: Apr. 5, 1972

[21] Appl. No.: 241,438

[30] Foreign Application Priority Data
Apr. 8, 1971  France.............................. 71.12504

[52] U.S. Cl.............. 260/79.3 R, 117/139, 260/77.5, 260/79.5 P, 260/79.5 C, 260/80.3 N, 260/85.5 B, 260/88.3 L, 260/94.7 S, 260/94.7 N, 260/239 R, 260/784, 260/785, 260/880 B
[51] Int. Cl............................................... C08f 27/08
[58] Field of Search......... 260/79.3 R, 77.5, 85.5 B, 260/88.3 L

[56] References Cited
OTHER PUBLICATIONS
Graf, R., Reactions with N–Carbonylsulfamoyl Chloride, Angew. Chem. Internat. Edit., Vol. 7, No. 3, pgs. 176, 177 (1968).

*Primary Examiner*—Christopher A. Henderson
*Attorney, Agent, or Firm*—Amster & Rothstein

[57] ABSTRACT
Ethylenically unsaturated polymers containing units with the formula $-CH_2-C(Y)=CH-CH_2-$, wherein Y is a hydrogen atom, a halogen atom, an alkyl group or an aryl group, are reacted upon chlorosulfonyl isocyanate $ClO_2S-N=C=O$, in the absence of oxygen and moisture, between $-20°C$ and $+150°C$, in a solvent, either without a catalyst, so as to obtain modified polymers containing units with the formula

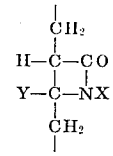 (I)

wherein Y has the above meaning and X is $SO_2Cl$ or H, or in the presence of a radical-forming initiator, so as to obtain modified polymers containing units with the formula

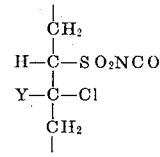 (II)

wherein Y has the above meaning, the polymers thus obtained being elastomeric, resinous or fibrous and having improved physical and chemical properties.

4 Claims, No Drawings

METHOD FOR THE CHEMICAL MODIFICATION OF ETHYLENICALLY UNSATURATED POLYMERS AND PRODUCTS OBTAINED THEREBY

BACKGROUND OF THE INVENTION

This invention relates to the preparation of novel types of polymers modified by the action of a chemical reagent belonging to the isocyanate class. It also relates to the modified polymers thus obtained.

More particularly, this invention relates to the fixing of reactive polar groups on a macromolecular chain through the addition of chlorosulfonyl isocyanate $ClO_2S$-NCO upon the double bonds of ethylenically unsaturated polymers (ethylenically unsaturated polymers).

There have been few publications to date in this field. There are some descriptions of the use of mono- or polyfunctional isocyanates or of sulfochlorinated derivatives. However, chlorosulfonyl isocyanate has not been previously used as a reagent.

SUMMARY OF THE INVENTION

The method according to this invention makes it possible to obtain novel, well-defined macromolecular structures, containing units with the following formulae:

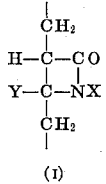

(I)

or

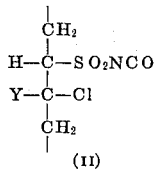

(II)

according to the conditions of the reaction.

In formulae I and II, Y stands for hydrogen, halogen alkyl (particularly methyl) or aryl, or any other organic group.

Formula I corresponds to the reaction products of chlorosulfonyl isocyanate upon unsaturated polymers without a catalyst. X then stands for the sulfochloride group or hydrogen.

Formula II corresponds to the reaction products of chlorosulfonyl isocyanate upon unsaturated polymers in the presence of radical-forming initiators (radical-forming catalysts or ultraviolet rays).

The unsaturated polymers which can undergo such chemical modification have a wide range of molecular weights and generally contain units with the formula

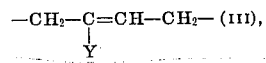

wherein Y has the above-mentioned meaning. They belong to the diene homopolymer class (e.g. butadiene, isoprene, chloroprene, piperylene homopolymers) or to the diene-alkene copolymer class (with comonomers such as styrene, isobutylene, acrylonitrile). Natural products such as rubber, gutta-percha, terpenes, which contain units III and therefore answer the above general definition, may be used within the scope of the invention. All such polymers may be used in the vulcanized state.

The conditions of the reaction (absence of oxygen and of humidity) make it possible to avoid the degradation of the polymer thus treated.

The method according to the invention is usually carried out at low or medium temperature (between −20°C and +150°C), more particularly between +10°C and +100°C. The polymer to be modified is dissolved in a dry solvent or mixture of solvents; the concentration of the dissolved polymer varies between 1% and 15% by weight. The solvents used should be inert towards chlorosulfonyl isocyanate. The preferred solvents are chlorinated solvents, cyclohexane, aliphatic hydrocarbons, ethers, etc. Dispersions of rubber in the said solvents may be used, for instance when starting from regenerated or unregenerated vulcanized rubbers. In every instance, solvent and polymer are dried by conventional physical or chemical means before they are brought together. Atmospheric oxygen is eliminated from the reaction space through displacement by an inert gas such as deoxygenized nitrogen or argon.

When the reaction is carried out in the presence of catalysts, giving structures of type II, radical-forming compounds such as azoic compounds, notably azo-di-isobutyronitrile, are used. The concentration of such initiators varies between 0.1% and 5% on the weight of the dissolved polymer. Another method, particularly suitable for fixing chlorosulfonyl isocyanate upon a polyene, makes use of the irradiation of the polymer solution with ultraviolet rays.

According to the general procedure, the polymer (and the catalyst, if any) are dissolved in the solvent, and a solution of chlorosulfonyl isocyanate in the same solvent is added, e.g. a 10% by weight solution of chlorosulfonyl isocyanate in cyclohexane. This is done slowly, with stirring. The mixture is then allowed to stand for a period of 30 minutes to 24 hours. However, the reaction is usually ended when the reagents have been in contact for 5 to 6 hours. The mixture usually solidifies more or less quickly and completely, according to the extent of the modification. The modified polymer is separated by filtration or by precipitation with a non-solvent. The excess reagent (chlorosulfonyl isocyanate) is thereafter eliminated through extraction of the raw product with cyclohexane. The purified product is then dried under vacuum at room temperature.

When no catalyst is used, structures of type (I) with $X=SO_2Cl$ are obtained. To obtain unsubstituted lactams (X = H), the product should by hydrolyzed. The polymer obtained through addition of isocyanate is dissolved (undried) in a ketone such as acetone or methyl ethyl ketone. The solution is slowly poured and stirred into a large amount to water, containing the amount of sodium bicarbonate required to neutralize the liberated acids (hydrochloric and sulfuric) as soon as they are formed. Approximately 1% by weight potassium iodide is added as catalyst. The vessel in which the hydrolysis occurs is kept at 80°–85°C and under reduced pressure. Under such conditions, the residual cyclohexane and the ketone are eliminated by distillation, and may be condensed, purified and recycled. During the hydrolysis, the modified polymer gradually precipitates. It is separated by filtration, thoroughly washed with water and dried under vacuum.

The chemical composition of the various reaction products is ascertained through conventional analytical means. It is used to compute the fixation level $t$, i.e. the number of molecules of the reagent fixed per 100 units of the unsaturated macromolecular chain. $t$ is given by the formula $$t = M \times A \times 100/M'(100 - a)$$

in which
M = weight of chain unit (68 for polyisoprenes, 54 for polybutadienes ...)
M' = molecular weight of reagent
$a$ = weight percentage of the reagent fixed upon the chain, according to the elementary analysis of the reaction product.

Besides, spectrographic investigations, notably in the infrared range, make it possible to characterize the nature of the chemical groups introduced into the modified polymer.

Numerous chemical reactions may be applied to the reaction products containing units I or II, so that the method according to the invention makes it possible to prepare a wide range of novel materials, having a wide range of practical uses.

According to the nature of the initial unsaturated polymer, the level of modification and the nature of the chemical functions introduced, elastomeric, resinous or fibrous products may be obtained. The addition of chlorosulfonyl isocyanate upon the double bonds of polyisoprenes, for instance, occurs according to a definite orientation, determined by the spatial arrangement of the methylated double bonds. Macromolecular structures are thus formed in which a number of isoprene units bear lactam groups (structure I) regularly arranged. This result in high strength properties, notably in a high modulus of elasticity. The polymers thus obtained contain both the hydrocarbon skeleton of conventional elastomers and polyamide groups which ensure the cohesion of the whole, as in the case of textile fibres. It will readily be understood that with higher levels of modification, the product changes from a flexible elastomer to a more rigid, high-strength polymer.

The different chemical structures obtained (notably for type I with X = H or $SO_2Cl$) allow functional reticulation through covalent or ionic bonds. The vulcanisates thus obtained have good heat strength, good ageing strength, and stand up well to degradation by chemicals or solvents.

Due to their high polarity, the modified products are compatible with a large number of materials and of inorganic or organic fillers. Consequently, the products modified with chlorosulfonyl isocyanate are highly adhesivating towards the main substrates: wood, glass, metals, textiles, etc..

In the case of elastic polymers, the treatment described herein makes it possible to modify the surface properties of vulcanized rubber mouldings, for instance greatly to lower the coefficient of friction, which is desirable for many uses.

DESCRIPTION OF THE PREFERRED EMBODIMENT

The following examples, while they do not restrict the scope of the invention, illustrate the invention and make it possible to specify some details of the procedure. The percentages are by weight.

EXAMPLE 1.

In a 10-litre 3-necked round-bottomed flask fitted with a mechanical stirrer, a dropping funnel and a reflux condenser protected against moisture, 120 g of natural rubber (1,4-cis-polyisoprene) were dissolved in 4 litres anhydrous cyclohexane. The rubber had been kneaded for 3 minutes to make the dissolution easier. A solution of 25 g chlorosulfonyl isocyanate in 250 ml cyclohexane was slowly added. The amount of reagent used in this example corresponds to a molecular ratio $r = 0.1$ ($r = p.M/m.P$, with $m = 141.5$ = molecular weight of the isocyanate, $p$ = weight of isocyanate used, $M$ = molecular weight of polymer chain unit = 68 for polyisoprenes, $P$ = weight of polymer used). The reaction was continued for 5 hours with stirring at 25°C. The reaction mixture gelled gradually. The reaction product was then separated by filtration, then extracted in a Soxhlet with cyclohexane to eliminate traces of uncombined reagent. The polymer was then dried under vacuum at room temperature, and its elementary composition was determined.

|  | C % | H % | O % | N % | S % | Cl % |
| --- | --- | --- | --- | --- | --- | --- |
| Product | 66.98 | 9.38 | 9.12 | 1.76 | 4.55 | 2.25 |
| Control rubber | 87.25 | 11.35 | 0.65 | 0.40 | — | — |

Investigation of the product by infrared spectrophotometry showed the presence of "sulfochlorinated lactam" structures with the formula:

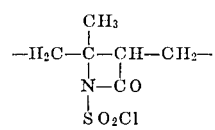

Absorption peaks were recorded at 1120–1150 cm$^{-1}$ (C-N-C bonds), 1800 cm$^{-1}$ (C=O groups), 1400 cm$^{-1}$ ($SO_2Cl$ groups) and 1040–1160 cm$^{-1}$ (lactum cycles). The elementary analysis makes it possible to compute the fixation level, which was here $t = 9.8$. Hence the reaction yield, $t/r=98\%$.

EXAMPLE 2.

The procedure was the same as in Example 1, but the amount of isocyanate was varied. The chemical structures formed were identical; the level of fixation alone varied. A range of novel products was thus obtained, ranging from modified elastomers ($t \leq 15$) to fibrous products($t > 50$). The materials with modification levels between 20 and 50 were akin to thermoplastic polymers. The table hereafter shows the chemical composition of the various reaction products according to the initial ratio $r$.

| Analytical determinations | | | | | | | t | Yield % |
|---|---|---|---|---|---|---|---|---|
| r | C % | H % | O % | N % | S % | Cl % | a % | |
| 0.02 | 84.70 | 11.10 | 3.20 | 0.50 | 0.41 | 0.16 | 3.4 | 1.8 | 92 |
| 0.05 | 80.18 | 10.36 | 3.80 | 1.01 | 1.80 | 0.87 | 8.2 | 4.7 | 94 |
| 0.1 | 66.98 | 9.38 | 9.12 | 1.76 | 4.55 | 2.25 | 15.3 | 9.8 | 98 |
| 0.2 | 56.30 | 8.40 | 12.30 | 3.10 | 6.40 | 3.60 | 27.3 | 19.7 | 98.5 |
| 0.5 | 49.30 | 6.70 | 19.20 | 4.60 | 9.60 | 10.60 | 41.1 | 41.7 | 84 |
| 1 | 37.10 | 4.60 | 27.70 | 5.80 | 10.50 | 15.50 | 51.4 | 68.7 | 68.7 |

Reaction temperature: 25°C; reaction time: 5 hrs; solvent: cyclohexane.

EXAMPLE 3.

The procedure was the same as in Example 1, but with synthetic polyisoprene with 96% 1,4-cis groups instead of natural rubber. The structures obtained were identical in both cases and the yields similar.

| r = 0.19 | C % = 63.10 | H % = 8.70 | O % = 15.90 |
|---|---|---|---|
| | N % = 2.80 | S % = 5.70 | Cl % = 7.40 |
| hence a % = 25 | t = 18.5 | | yield % = 93 |

EXAMPLE 4.

Under the same conditions as in Example 1, chlorosulfonyl isocyanate was reacted upon butyl rubber (random copolymer of 96.5% isobutylene and 3.5% isoprene). The reagent settled exclusively on the isoprene groups in the chain, giving structures of type I ($n = 1$, $X = SO_2Cl$).

| r = 1 | C % = 82.50 | H % = 14.10 | O % = 2.90 |
|---|---|---|---|
| | N % = 0.40 | S % = 0.67 | Cl % = 0.30 |
| hence a % = 4 | t = 65 | | yield % = 65 |

EXAMPLE 5.

The general procedure described in Example 1 was followed, but with 1,4-trans polychloroprene instead of polyisoprene. The polychloroprene was a commercial product which has not been purified. Polychloroprene reacted less easily on chlorosulfonyl isocyanate than polyisoprene, and the reaction temperature had to be raised to 60°C. The solvent used was chloroform.

The following mixture was refluxed at 61°C for 7 hours:

| polychloroprene | 60 g |
| chloroform | 2000 ml |
| chlorosulfonyl isocyanate | 60 ml |

The mixture was precipitated with hexane and the precipitate was extracted with hexane, hence a novel polymer with the following composition:

| C % = 49.85 | H % = 6.09 | O % = 5.86 |
|---|---|---|
| S % = 2.27 | N % = 1.4 | Cl % = 35.15 |

The amount of reagent added was therefore approximately 10%.

EXAMPLE 6.

140 g of the modified product described in Example 1 was dissolved in 1500 ml acetone. The polymer was used immediately after filtration, without having been dried. The solution was placed in a dropping funnel over one of the necks of a three-necked round-bottomed flask fitted with a mechanical stirrer and a distilling condenser. The flask contained 2 litres water, the theoretical amount (9 g) of sodium bicarbonate to neutralize the acids, and a trace of potassium iodide as catalyst. The mixture was heated to 80°-85° C under reduced pressure, and the solution of modified rubber was slowly stirred in. The hydrolyzed product precipitated as soon as it formed. The acetone and cyclohexane distilled continuously: they were condensed and recycled to another operation. The polymer was washed with water to eliminate the sodium salts, extracted with acetone, then dried under vacuum at room temperature. The elementary composition was:

C % = 81.50   H % = 10.70   O % = 4.20   N % = 3.65

Infrared spectrophotometry showed the presence of absorption bands characteristic for

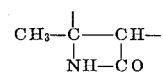

structures from the hydrolysis of the sulfochlorinated lactams described in Examples 1–4:
1120 cm$^{-1}$ (C-N-C) 1720 cm$^{-1}$ (C=O) 3250 cm$^{-1}$ (NH)
1030 cm$^{-1}$ (cycle)

EXAMPLE 7.

Treatment of an oligomer with low molecular weight.

This example relates to the reaction of chlorosulfonyl isocyanate upon an unsaturared oligomer with a low molecular weight. This gives polymers with low molecular weights, which are highly reactive and can undergo further polymerization or polycondensation.

10 g of natural rubber were introduced in small fractions into a vessel at 650°-700°C under 7 mm of mercury. Copper powder was used as the degradation catalyst. 8 g of pyrolysate (fraction distilling between 50°C and 260°C under atmospheric pressure) were collected in a trap cooled in liquid nitrogen.

5 g of this pyrolysate (oligomer) were dissolved in 50 ml anhydrous ethyl ether. This was done in a vessel protected against moisture and cooled to 0°C in an ice bath. A solution of 10.40 g chlorosulfonyl isocyanate in 30 ml ether was slowly introduced, the temperature being kept at 0°C. After 30 minutes, the mixture was allowed to heat up to room temperature. A highly hygroscopic oil was brown collected by decanting. The analysis of the dried product confirmed the presence of sulfochlorinated lactam groups, with a high yield (90%).

| | | |
|---|---|---|
| C % = 34.40 | H % = 3.80 | O % = 23.15 |
| N % = 6.70 | S % = 15.35 | Cl % = 17.10 |

Hydrolysis of the compound according to the procedure of Example 6 gave water-soluble products.

EXAMPLE 8.

This example relates to a preparation effected under the conditions of a radical-promoted reaction. in a 10-litre vessel fitted with a mechanical stirrer, a reflux condenser, a dropping funnel and an immersed ultraviolet lamp (maximum intensity at 250 mm), 100 g 1,4-cis-poly= butadiene were dissolved in 4 litres anhydrous cyclohexane. The reaction was effected under nitrogen. 13 g chlorosulfonyl isocyanate were then added ($r = 0.5$). The mixture was stirred and illuminated for 8 hours at room temperature. The gel obtained was purified by extraction with cyclohexane, then dried under vacuum to constant weight.

| | | |
|---|---|---|
| C % = 41.50 | H % = 7.30 | O % = 31.90 |
| N % = 5.50 | S % = 10.80 | Cl % = 6.50 |
| hence a % = 48 | t = 35.3 | yield % = 71 |

Infrared stectrography showed structures which were different from those obtained without a radical-forming initiator. In particular, an absorption band was recorded at 2320 cm$^{-1}$: this can be attributed to free $-N=C=O$) groups belonging to structures of type II:

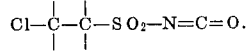

EXAMPLE 9

In a 10-litre vessel with mechanical stirrer, reflux condenser and dropping funnel, 100 g 1,4-cis-poly= butadiene were dissolved under nitrogen in 4 litres anhydrous cyclohexane, with 2 g azo-di-isobutyronitrile as the radicalforming catalyst. 26 g chlorosulfonyl isocyanate ($r=1$) were then slowly stirred in. The mixture was heated to 70°C for 5 hours. The purified and dried product had the following characteristics:

| | | | |
|---|---|---|---|
| C % = 47.20 | H % = 7.00 | O % = 21.30 | N % = 4.80 |
| S % = 9.10 | Cl % = 11.50 | | |
| hence a % = 48 | t = 35.3 | yield % = 35.3 | |

The structure of the product was the same as for the polymers prepared with ultraviolet illumination (Example 8).

EXAMPLE 10.

The procedure was the same as in Example 8, but with a random copolymer of 65% butadiene and 35% acrylonitrile instead of polybutadiene. To a solution of 45 g copolymer in 2,250 ml anhydrous chloroform were added 77 g chlorosulfonyl isocyanate dissolved in 150 ml chloroform. The mixture was illuminated with ultraviolet light at room temperature for 16 hours. About 1,500 ml chloroform were vacuum distilled, then the polymer was precipitated with cyclohexane. The same solvent was used to extract traces of free isocyanate in a Soxhlet. Once dried, the product had the following composition:

| | | |
|---|---|---|
| C % = 51.64 | H % = 7.98 | O % = 22.76 |
| N % = 8.11 | S % = 8.76 | Cl % = 3.50 |

EXAMPLE 11.

The procedure was the same as in Example 8, but with a trisequential styrene-butadiene-styrene block copolymer instead of polybutadiene. An unpurified commercial product was used.

160 g of the polymer were dissolved in 8 litres anhydrous cyclohexane and 195 ml chlorosulfonyl isocyanate added. The mixture was illuminated with ultraviolet light for 7 hours, then left standing for 24 hours. The gel obtained was purified by extraction with hexane. After purifying and drying, the white powder obtained had the following composition:

| | | |
|---|---|---|
| C % = 58.02 | H % = 6.97 | O % = 16.02 |
| N % = 3.78 | S % = 9.84 | Cl % = 7.60 | which corresponds to the fixing of about 17% isocyanate.

This powder, which was soluble in acetone, was then partly hydrolyzed at 80°C. The fibrous polymer obtained had the following composition:

| | | |
|---|---|---|
| C % = 59.40 | H % = 7.35 | O % = 17.70 |
| N % = 3.22 | S % = 4.50 | Cl % = 3.50 |

EXAMPLE 12.

This example relates to a special type of hydrolysis of the products obtained in examples 1-2-3.

The procedure was similar to Example 6, but with caustic soda instead of sodium bicarbonate. 60 g natural polyisoprene modified with isocyanate ($r = 0.5$, $t = 41.7$) were dissolved in 700 ml acetone. The solution was slowly stirred into a solution of 100 g caustic at 80°C. The product swelled greatly in water and adhered strongly notably to glass and wood. It was washed with methanol and dried under vacuum.

| | | |
|---|---|---|
| C % = 36.20 | H % = 6.90 | O % = 23.90 |
| N % = 3.20 | S % = 5.80 | Cl % = 1.90 |
| Na % = 21 | | | under such conditions of hydrolysis, the lactam cycle is therefore opened and gives the sodium salt of a polyacid with the general formula

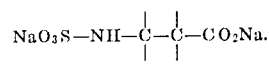

EXAMPLE 13.

10 g of the polymer obtained in Example 12 were dispersed in a 36.5 g/l solution of hydrochloric acid. The mixture was heated at 70°C for 2 hours. Under such conditions, a number of polyamino-acid structures with the following formula were formed:

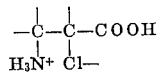

C % = 55.00   H % = 9.50   O % = 18.60
N % = 3.00   Cl % = 1.67

EXAMPLE 14.

This example relates to the preparation of a novel product through substitution of the chlorine atoms in the structures described in Examples 1 to 3.

80 g modified polyisoprene ($t = 19$) prepared as in Example 2 were dissolved in 600 ml acetone. The solution was introduced into a vessel fitted with a reflux condenser protected against moisture and a dropping funnel. 160 ml aniline were added through the latter. The cooled mixture was poured into methanol, which precipitated a product with the following composition:

C % = 73.44   H % = 9.28   O % = 6.11
N % = 3.60   S % = 2.93   Cl % = 0.01

Infrared spectrophotometry confirms the presence of aromatic sulfonamide groups with the structure:

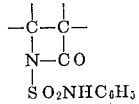

EXAMPLE 15.

The products modified with chlorosulfonyl iso=cyanate have higher heat strength than the conventional hydrocarbon polymers. As an example, the heat strength of a modified polyisoprene (type I structure with X = H, $t = 68$) was compared with the heat strength of a control polyisoprene. The trials were done by means of an Adamel thermobalance in a normal atmosphere (heating rate 150°C/hr.).

| Temperature (°C) | Loss of weight (%) | |
|---|---|---|
| | modified polyisoprene | control polyisoprene |
| 153 | 3 | — |
| 255 | 10 | 1 |
| 276 | 17 | — |
| 303 | — | 2.5 |
| 375 | 32 | 50 |
| 410 | 61 | 88 |
| 445 | 68 | 95 |
| 518 | 84 | — |
| 580 | 93 | — |

At 410°C, the control polyisoprene is almost entirely destroyed, while the modified polyisoprene retains 40% of its initial weight.

EXAMPLE 16.

The products modified with chlorosulfonyl isocyanate can be vulcanized with conventional systems (sulfur + accelerators) or with specific reagents which can react upon combined lactams. As an example, the following table shows a few vulcanizing formulations for a polyisoprene A (according to Example 2, $t = 9.8$) and for the corresponding product B after hydrolysis according to Example 6. The amounts are by weight.

| | A | $B_1$ | $B_2$ |
|---|---|---|---|
| Polyisoprene A | 100 | — | — |
| Polyisoprene B | — | 100 | 100 |
| Magnesium oxide | 10 | — | — |
| Bis-mercaptobenzothiazolyl disulfide | 1.5 | — | — |
| Dipentamethylene-thiuram tetrasulfide | 1.5 | — | — |
| Zinc oxide | — | 5 | — |
| Stearic acid | — | 3 | — |
| Cyclohexyl benzothiazol-sulfenamide | — | 0.8 | — |
| Sulfur | — | 2.5 | — |
| Paraformaldehyde | — | — | 3 |
| Vulcanizing temperature | 143°C | 143°C | 143°C |
| Vulcanizing time | 45 min | 30 min | 45 min |

The strength properties and solvent strengths of the vulcanisates are shown hereafter.

| | A | $B_1$ | $B_2$ |
|---|---|---|---|
| Breaking strength (kg/cms) | 74.5 | 69 | 47 |
| Modulus at 100% (kg/cm2) | 39.3 | 35.4 | 36.2 |
| Elongation at break (%) | 370 | 570 | 120 |
| Shore hardness (°) | 70 | 46 | 62 |
| Tearing strength (kg/cm) | 35 | 52 | 17 |
| Swelling in benzene (volume %)* | 327 | 411 | 344 |
| Swelling in chloroform (volume %)* | 366 | 412 | 379 |
| Swelling in methyl ethyl ketone (volume %) * | 186 | 171 | 187 |

* After 48 hours at 20°C.

With unfilled formulations, the vulcanisates then have high modulus, low elongation and good solvent swelling strength.

The products modified with chlorosulfonyl isocyanate and containing inorganic fillers such as silica (30% by weight) have outstanding strength properties, as evidenced by the following results:

Polyisoprene $B_1$ (vulcanized 30 mins at 150°C):

| Modulus at 300% (kg/cms) | 102 |
| Breaking strength (kg/cm2) | 127 |
| Elongation at break (%) | 385 |
| Shore hardness (°) | 80 – 84 |

Unmodified control polyisoprene (vulcanized 20 mins at 150°C):

| Modulus at 300% (kg/cm2) | 21.7 |
| Breaking strength (kg/cm2) | 180 |
| Elongation at break (%) | 712 |
| Shore hardness (°) | 41 – 43 |

Whereas the increase in strength due to filling with silica is usually small for unmodified hydrocarbon elastomers, the effect is much greater for products modified with chlorosulfonyl isocyanate.

EXAMPLE 17.

According to a variation of the invention, chlorosulfonyl isocyanate is reacted with any one of the above-mentioned polymers, but after they have been vulcanized. This example relates to the surface modification of moulded and vulcanized rubber objects, in particular.

Polyisoprene plates were vulcanized with a conventional system (sulfur + accelerators, peroxide, etc..). The samples wer immersed in 2% and 5% chlorosulfonyl iso= cyanate solutions in cyclohexane for 30 minutes at room temperature under nitrogen in a vessel protected against moisture. (The reagent can also be applied with a brush). Hydrolysis was then effected under the conditions of Example 6 by treatment with a sodium bicarbonate aqueous solution at 90°C. The coefficient of friction Cf was determined by means of a device which measures the tangential stress.

A rubber test piece (1.5 cm wide, 0.2 cm thick) lying on a plane surface bore a carriage which could receive increasing weights giving a perpendicular force $F_N$. By means of a transmission system with a pulley, an increasing force $F_T$ was applied to the carriage; this was the tangential force required for moving the carriage on the test piece. The coefficient of friction Cf was defined by the relationship $Cf = F_T/F_N$. Since the cross sections of the various test pieces were not exactly identical, the variations of Cf were recorded vs. the pressures (in g/cm2) applied to the test piece. The following Table shows the results.

Control polyisoprene

| Pressure (g/cm2) | $F_N$ (kg) | $F_T$ [1](kg) | Cf |
|---|---|---|---|
| 120 | 1.332 | 2.830 | 2.13 |
| 210 | 2.332 | 4.350 | 1.86 |
| 300 | 3.332 | 5.360 | 1.61 |
| 390 | 4.332 | 6.600 | 1.52 |
| 485 | 5.332 | 8.040 | 1.50 |

Polyisoprene treated with a 2% solution of $ClO_2S-NCO$ [2]

| | Not hydrolyzed | | | | Hydrolyzed | | |
|---|---|---|---|---|---|---|---|
| Pressure (g/cm²) | $F_N$ | $F_T$ | Cf | Pressure (g/cm²) | $F_N$ | $F_T$ | Cf |
| 170 | 1.332 | 0.588 | 0.44 | 170 | 1.332 | 0.635 | 0.62 |
| 300 | 2.332 | 0.880 | 0.38 | 300 | 2.332 | 0.933 | 0.40 |
| 425 | 3.332 | 1.320 | 0.40 | 425 | 3.332 | 1.340 | 0.40 |
| 555 | 4.332 | 1.730 | 0.40 | 555 | 4.332 | 1.570 | 0.36 |
| 680 | 5.332 | 2.120 | 0.39 | 680 | 5.332 | 2.085 | 0.39 |
| 810 | 6.332 | 2.175 | 0.34 | | | | |

Polyisoprene treated with a 5% solution of $ClO_2S-NCO$ [2]

1 Measured on a smooth steel surface.
2 Solvent: cyclohexane, 30 mins. at 25°C.

The coefficient of friction Cf is considerably reduced after treatment with isocyanate. This property is turned to account in the manufacture of parts with a relative movement of a metal part and an elastomer part, such as piston packings or sealing rings with circular cross-sections.

What is claimed is:

1. A modified non vulcanized or vulcanized polymer consisting essentially of units with the formula

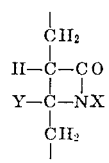

(1)

wherein Y is a hydrogen atom, a halogen atom, an alkyl group or an aryl group, and X is sulfochloride group $SO_2Cl$, as produced by the method comprising reacting an ethylenically unsaturated polymer containing —$CH_2$—C(Y)=CH—$CH_2$— units, wherein Y is a hydrogen atom, a halogen atom, an alkyl group or an aryl group, with chlorosulfonyl isocyanate, $ClO_2S$—N=C=O), in the absence of oxygen and moisture, at temperatures between −20°C and +150°C, in a dry solvent or mixture of solvents inert towards chlorosulfonyl isocyanate, the concentration of the said unsaturated polymer in the solution being 1% to 15% by weight, without a catalyst.

2. A modified non vulcanized or vulcanized polymer consisting essentially of units with the formula

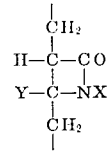

(1)

wherein Y is a hydrogen atom, a halogen atom, an alkyl group or an aryl group, and X is a hydrogen atom, as produced by the method comprising reacting an ethylenically unsaturated polymer containing —$CH_2$—C(Y)=CH—$CH_2$— units, wherein Y is a hydrogen atom, a halogen atom, an alkyl group or an aryl group, with chlorosulfonyl isocyanate, $ClO_2S$—N=C=O, in the absence of oxygen and moisture, at temperatures between −20°C and +150°C, in a dry solvent or mixture of solvents inert towards chlorosulfonyl isocyanate, the concentration of the said unsaturated polymer in the solution being 1% to 15% by weight, without a catalyst, so as to obtain a modified polymer containing units of formula

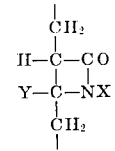

(1)

wherein Y is a hydrogen atom, a halogen atom, an alkyl group or an aryl group, and X is a sulfochloride group, $SO_2Cl$, and further comprising the step of hydrolyzing said modified polymer with units of the above formula (I) wherein X = $SO_2Cl$, to obtain a modified polymer with units of the above formula (I) wherein X = H, this hydrolysis being performed by dissolving said modified polymer with units of the above formula (I) wherein X = $SO_2Cl$ in a ketone and pouring the resulting solution into water containing a neutralizing agent for the released hydrochloric and sulfuric acids, the reaction mixture being maintained at 80°–85°C.

3. A modified non vulcanized or vulcanized polymer according to claim 1, wherein during the reaction of said ethylenically unsaturated polymer upon chlorosulfonyl isocyanate the temperature lies between +10°C and +100°C.

4. A modified non vulcanized or vulcanized polymer according to claim 2, wherein during the reaction of said ethylenically unsaturated polymer upon chlorosulfonyl isocyanate the temperature lies between +10°C and +100°C.

* * * * *